Nov. 12, 1963                S. SCHNEIDER ETAL                3,110,834
                          LONG LIFE HYDROGEN THYRATRON
                              Filed Oct. 27, 1960
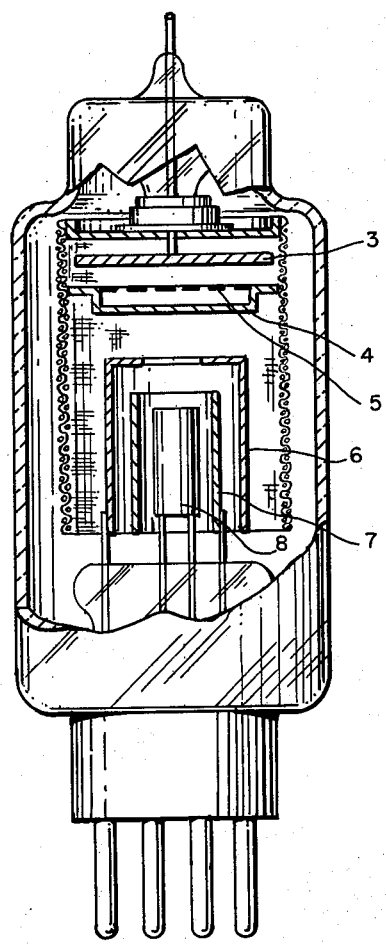
INVENTOR,
SOL SCHNEIDER
MORTIMER H. ZINN
BY
*Harry M. Saragovitz*
ATTORNEY.

United States Patent Office 3,110,834
Patented Nov. 12, 1963

3,110,834
LONG LIFE HYDROGEN THYRATRON
Sol Schneider, Little Silver, and Mortimer H. Zinn, West Long Branch, N.J., assignors to the United States of America as represented by the Secretary of the Army
Filed Oct. 27, 1960, Ser. No. 65,550
3 Claims. (Cl. 313—54)
(Granted under Title 35, U.S. Code (1952), sec. 266)

The invention described herein may be manufactured and used by or for the Government for governmental purposes without the payment of any royalty thereon.

The present invention relates to gas discharge tubes of the thyratron type and more particularly to such devices employing hydrogen as an ionizable medium.

The useful life of gas discharge tubes is limited by the gradual absorption of the gas by the tube elements, such as the metallic electrodes and the glass envelope. This phenomenon is known as "gas clean-up." In the past, elaborate measures have been employed to overcome this difficulty, e.g., reservoirs of reserve gas have been provided to replenish the supply as it was absorbed. In conjunction with these reservoirs, means were required to control the rate of release of gas so that the proper pressure would be maintained within the tube. All of these auxiliary devices added greatly to the complexity and expense of these tubes.

The present invention provides for the substantial elimination of gas clean-up in hydrogen thyratrons by the addition of certain isotopes of hydrogen to the hydrogen atmosphere.

It is therefore an object of the invention to provide a hydrogen thyratron which substantially eliminates clean-up without the use of auxiliary structure.

It is a further object to provide an ionizable atmosphere for a thyratron which greatly reduces gas clean-up.

The drawing illustrates a particular tube to which the invention has been successfully applied. The element 3 therein is the anode, 4 the grid baffle, 5 the grid, 6 the cathode heat baffle, 7 the cathode and 8 the heater. The large surface area of the many metal electrodes in such a tube results in rapid absorption of gas when filled with pure hydrogen.

We have found that the addition of either of the isotopes of hydrogen, namely, deuterium or tritium, to the atmosphere within hydrogen thyratrons results in greatly extended tube life due to reduction in gas clean-up. Experiments indicate that an atmosphere of hydrogen mixed with either 2–4% of deuterium by weight or 3–6% of tritium by weight give the desired results. Although tritium is radioactive, it emits only low energy beta rays which are blocked by the glass tube envelope and there-fore present no radiation hazard to operating personnel. Further, there is no possibility of ionization of the hydrogen by the radioactive tritium, since its activity is low and its concentration small.

No scientific explanation of the unexpected results obtained from these mixtures can be given, however several characteristics of these isotopes may account for their behavior in this environment. It is known that the rate of diffusion of gaseous atoms and molecules through solids varies inversely with the square root of the mass thereof. Since deuterium and tritium have atomic masses of double and triple respectively that of hydrogen, their diffusion rates would be considerably less than that of hydrogen. Diffusion of the thyratron gases into the metal electrodes and envelope accounts for a major part of gas loss. In addition to a lower diffusion rate, the presence of the isotopes actually inhibits or reduces the diffusion or absorption of the hydrogen by the tube structure. The reason may be that the more massive isotope atoms actually fill up the interstices and micropores on the solid surfaces, thereby physically preventing the diffusion of hydrogen. Further, the faster chemical reaction time of the heavy isotopes compared to hydrogen may have some effect in reducing clean-up, however the exact reason for this is unknown at present.

Actual tests in which the disclosed atmospheres have been used in type 5C22 tube envelopes have resulted in an increase in tube life by a factor of more than 2 to 1 compared to conventional hydrogen filled tubes.

Since the practice of this invention may take various forms not specifically discussed, it is to be understood that the invention should be limited only by the language and spirit of the following claims.

What is claimed is:

1. A gaseous discharge tube of the thyratron type filled with an ionizable mixture consisting essentially of 2–4% by weight of deuterium and the remainder hydrogen.

2. A gaseous discharge tube of the thyratron type filled with an ionizable mixture consisting essentially of 3–6% tritium by weight and the remainder hydrogen.

3. An ionizable atmosphere for a thyratron tube consisting essentially of a mixture of hydrogen and tritium gases, the concentration of tritium being below that which will cause ionization from radioactivity.

References Cited in the file of this patent
UNITED STATES PATENTS

| | | |
|---|---|---|
| 2,793,314 | White | May 21, 1957 |
| 2,860,269 | Jefferson | Nov. 11, 1958 |